United States Patent [19]
Mehra-Palta et al.

[11] Patent Number: 4,550,528
[45] Date of Patent: Nov. 5, 1985

[54] ASEXUAL PROPAGATION OF PINE TREES

[75] Inventors: Asha Mehra-Palta, Monsey; Kimnaja Gross, Cornwall, both of N.Y.

[73] Assignee: International Paper Company, New York, N.Y.

[21] Appl. No.: 575,750

[22] Filed: Feb. 1, 1984

[51] Int. Cl.[4] .................. A01G 1/00; A01G 23/00
[52] U.S. Cl. .................................. 47/58; 47/DIG. 3
[58] Field of Search ............. 47/1, 4, 5.5, 58, DIG. 3

[56] References Cited

U.S. PATENT DOCUMENTS

| 2,971,291 | 2/1961 | Herrmann . | |
| 3,012,372 | 12/1961 | Hechinger | 47/58 |
| 4,199,897 | 4/1980 | Greenwood . | |
| 4,338,745 | 7/1982 | Misawa et al. . | |
| 4,354,327 | 10/1982 | Smeltzer et al. . | |
| 4,377,921 | 3/1983 | Mehra-Palta et al. . | |

FOREIGN PATENT DOCUMENTS

| 1322148 | 3/1972 | United Kingdom | 47/5.5 |
| 719531 | 3/1980 | U.S.S.R. | 47/DIG. 3 |
| 728784 | 4/1980 | U.S.S.R. | 47/4 |

OTHER PUBLICATIONS

L. N. Hodgson, *South African Forestry Journal*, No. 100, 38–42 (1977).
H. Neinstaedt, *General Technical Report*, USDA Forest Service North Central Forest Experiment Station, No. NC-21, 51–59 (1976).
R. Lowery, *Malaysian Forester*, 43.1, 16–23 (1980).
R. A. Plumptre, *Commonwealth Forestry Review*, 58.3, 181–189 (1979).
H. Chaperon, *AFOCEL Etudes et Recherches*, No. 12, 19–31 (1979).
A. Franclet, *AFOCEL Etudes et Recherches*, No. 12, (1979).
T. Furuno et al., *Bulletin of the Kyoto University Forest*, No. 45, 9–26 (1973) (Dialog abstract on seventh page of Dialog search report).
G. Stockley, *Farm Forestry*, 17, 96–98 (1975).
W. J. Libby et al., *Acta Horticulturae*, 56, 91–98 (1976).
P. V. Bolstad et al., *Sivae Genetica*, 31, 1–5 (1982).
J. W. P. Nicholls et al., *New Zealand Journal of Forestry Science*, 6, 397–408 (1976).
W. J. Libby et al., *New Zealand Journal of Forestry Science*, 2, 263–283 (1972).
H. W. Kolster, *Populier*, 10.1, 11–12 (1973) (Dialog abstract on 6th page of search report).
M. D. Danilov et al., *Lesnoi Zhurnal*, 10.5, 5–8 (1973) (Dialog abstract on 7th page of Dialog search report).
Anon., "Mist-Making Device Helps Root Soft-Wood Cuttings", *The Sunday Star*, Washington, D.C., 7/21/57, p. C-7.
O'Rourke, F. L., "The Effect of Juvenility on Plant Propagation", *Proceedings Plant Propagators Society*, Pub. unknown, pp. 33–37 (11/8–9/1951).
Hartmann, H. T. et al., "Selection of Cutting Material; Juvenility Factor or Phase Change", *Plant Propagation* (4th Ed.) Prentice Hall, Inc., pp. 258–263, ©1983.

*Primary Examiner*—James R. Feyrer
*Attorney, Agent, or Firm*—Richard J. Ancel

[57] ABSTRACT

A method is provided for asexually propagating pine trees, preferably loblolly pine, by vegatative propagation. According to this method, pine seedlings are hedged by severing the main stem and detaching the branches so that only one lateral branch is left intact and attached to the remaining main stem. The hedged seedlings are maintained under conventional growth conditions at least until elongated shoots having juvenile characteristics are obtained at the cut end of the main stem. The elongated shoots are then severed from the main stem and rooted by conventional means.

9 Claims, 4 Drawing Figures

ASEXUAL PROPAGATION OF PINE TREES

FIELD OF THE INVENTION

The present invention relates to a method of asexually propagating pine trees. More particularly, the present invention relates to a method of asexually propagating pine trees by severely hedging the pine trees to produce shoots and then rooting the shoots.

BACKGROUND OF THE INVENTION

Approximately thirty species of gymonosperms, the so-called softwoods, comprise the great bulk of the commercially important timber species useful for construction lumber. Among these are the pines which include loblolly pine (*Pinus taeda*), slash pine (*Pinus elliotii*), longleaf pine (*Pinus palustris*), shortleaf pine (*Pinus echinata*), ponderosa pine (*Pinus ponderosa*), red pine (*Pinus resinosa*), jack pine (*Pinus banksiana*), Eastern white pine (*Pinus strobus*), Western white pine (*Pinus monticola*), sugar pine (*Pinus lambertiana*), lodgepole pine (*Pinus contorta*); Douglas-fir (*Pseudotsuga menziesii*); Western hemlock (*Tsuga canadensis*); Sitka spruce (*Picea glauca*); redwood (*Sequoia sempervirens*); the true firs, including silver fir (*Abies amabilis*), grand fir (*Abies grandis*), noble fir (*Abies procera*), white fir (*Abies concolor*), balsam fir (*Abies balsamea*); and the cedars which include Western red cedar (*Thuja plicata*), incense cedar (*Libocedrus decurrens*), Port Orford cedar (*Chamaecyparis lawsoniona*), and Alaska yellow-cedar (*Chamaecyparis nootkatensis*), and Western larch (*Laryx occidentalis*).

Though not inclusive of all of the commercially important softwood species, the aforementioned group of conifers does include those pines which are generally considered to be commercially significant and which are or are becoming subject to intensive silvicultural management. Among these commercially significant pines, ponderosa pine, Western hemlock, Douglas-fir, and the four so-called southern yellow pines, slash, longleaf, shortleaf, and loblolly, are particularly important. Of this last group, loblolly pine and Douglas-fir have been the subject of intensive tree improvement breeding programs Loblolly pine and Douglas-fir, like many desirable species of trees, produce good seed crops only at infrequent and undependable intervals, and good cone crops typically occur only every five to seven years. In the normal course of events, a loblolly pine seedling produces male and female flowers when it is about 11 to 16 years old. When it does that, pollen from other trees will fertilize the female flowers, which will then produce seeds. About two years later, the seeds can be harvested and used to generate new plants. While the tree can pollinate some of its own female flowers so that some of the seedlings produced can be quite similar to the parent, none of the seedlings produced will be genetically identical.

Initially, the production of seedlings depended on wild seed which is drawn from an enormously varied gene pool. It was not long before foresters began to recognize that some seedlings grew far better in localized environments than others. For example, in the Douglas-fir region, it was found to be important to plant seedlings at the same approximate altitude from which the seed had been obtained. Soon it was realized that many other tree characteristics were heritable and while these traits vary from species to species, among them might be mentioned growth rates, the tendency to have straight or crooked stems, wood density, and light as opposed to heavy limbs. Nursery managers began searching their forests for and collecting seeds from wild trees that possessed one or more desirable characteristics. However, depending on the species, it may take from fifteen to fifty years for a new generation to produce seeds of its own and several generations of breeding are required in order to maximize genetic improvement.

Accordingly, less time consuming methods have been sought to obtain genetically superior trees. To this end, various methods such as embryogenesis, organogenesis and vegetative propagation have been investigated.

Organogenesis includes the initiation of shoots from meristematic centers induced in cultured tissue explants and the subsequent rooting of these shoots. As the method is generally employed, a portion of a donor plant is excised, sterilized and placed on a growth medium. The tissue most commonly used is a portion of young cotyledon from newly sprouted seeds or the intact embryo dissected from a seed. A much lower degree of success has been reported when tree leaves or stem tissues are cultured.

In the embryogenesis process, a group of cells becomes organized into a bipolar embryoid which will, in a favorable environment, develop bud primordia at one end and root primordia at the opposite end. One commonly reported route to production of plantlets by embryogenesis, though not reported for softwoods, has been through suspension culture wherein groups of cells are suspended in a gently agitated liquid medium containing various plant growth hormones until bipolar embryoids are differentiated and developed. The embryoids are then placed on a nutrient medium for further development into plantlets.

Vegetative propagation has been practiced by grafting or rooting of stem cuttings and by hedging. So far as is known, severe hedging of seedlings, that is, where only one branch with minimal foliage is left at the base of the seedling, has not been reported previously. A procedure involving extensive pruning has also been practiced, but requires that enough foliage remain on the parent tree to ensure that it maintains an excellent vegetative state.

Vegetative propagation, when combined with a genetic selection program, offers advantages over selection and sexual reproduction of select trees. Whereas sexual reproduction captures only the additive genetic component of superiority among selected trees, vegetative propagation captures both the additive and non-additive genetic components of outstanding clones. Whereas sexual reproduction results in genetic recombination, and thus a high degree of variability even within single families, vegetative reproduction results in both growth uniformity and predictability of many important characteristics, both selected and unselected within each clone. Additionally, the collection of sufficiently large quantities of seed to meet planting demands may be both difficult and costly and thus the objective of planting genetically improved trees can be more rapidly achieved by expanding a limited number of genetically improved seedlings by means of vegetative propagation.

One problem encountered with vegetative propagation is that the genetically superior tree that one is trying to reproduce is often an old tree which has shown its potentialities. The growth of its organs is often reduced or controlled by the appearance of restrictions which inhibit or modify certain functions. Obtaining a new plant from such organs is difficult. This phenomenon is described under the terms of aging or maturation. The totipotentiality of the meristems of the young plant gives away to the more or less advanced specialization of the meristems of the old plant. Vegetative propagation by rooting cuttings supposes that this obstacle can be removed by restoring the totipotentiality of the meristem.

Accordingly, there exists a need for a method of asexually propagating pine trees by vegetative propagation which can be employed to produce a large number of genetically improved seedlings from selected, genetically superior trees.

SUMMARY OF THE INVENTION

A method is provided for asexually propagating pine trees, preferably loblolly pine, by vegetative propagation. According to this method, pine seedlings are hedged by severing the main stem and detaching the branches so that only one lateral branch is left intact and attached to the remaining main stem. The hedged seedlings are maintained under conventional growth conditions at least until elongated shoots are obtained at the cut end of the main stem. These shoots are succulent, have morphologically juvenile characteristics, and originate in close proximity to the root system. The elongated shoots are then severed from the main stem and rooted by conventional means.

DESCRIPTION OF THE PREFERRED EMBODIMENTS

Figure 1:
FIG. 1 is a photograph of a loblolly pine seedling before hedging.

The present method may be employed to produce a large number of genetically improved pine trees from selected, genetically superior pine seedlings. While any of the various species of pine trees belonging to the family Pinaceae may be employed, it is preferred to employ loblolly pine.

In practicing the method of the present invention, a pine seedling having the desired properties is selected or grown. By seedling is meant a young tree, that is, a tree up to about 4 years old, or a tree hedged (when a young tree) to typically less than about 12 inches in height. Preferably, a tree between about 6 months and 4 years old is employed; more preferably a tree between about 1 and 3 years old. It is preferred to maintain the seedlings in a greenhouse environment both before and after hedging.

According to the present method, the main stem of the pine seedling is severed and the branches detached from the remaining main stem such that only one lateral branch remains intact and attached to the remaining main stem. The main stem of the seedling is severed at a height above the ground of up to about 12 inches, more preferably from about 8 to about 12 inches.

The remaining main stem with attached lateral branch, which may be referred to as a severely hedged seedling, is maintained under normal growth conditions for pine trees, preferably in a greenhouse, until the cut end of the stem produces shoots having juvenile characteristics, that is, shoots which are succulent and have mostly primary needles similar to those of a germinated seedling (secondary needles or needle fascicles have not yet developed). Typically, the cut end of the main stem will produce shoots in a period of from about 4 to about 8 weeks. These shoots form in close proximity to the root system. Once the shoots have elongated to a length suitable for rooting, preferably from about ½ inch to about 2 inches, more preferably about 1 inch, they are severed from the stem. Once the shoots are severed, the severely hedged seedling produces additional shoots.

The severed shoots are then rooted in soil, preferably on a mist bench. To obtain a high rooting frequency, it is essential to use only juvenile shoots that contain mostly primary needles and are preferably devoid of needle fascicles. A preferred rooting method is to contact the cut ends of the shoots with a rooting medium containing indole-3-butyric acid, preferably Hare's powder, which is described below, and then plant the shoots in soil in an environment where the shoots receive from about 1.5 to about 4.5 ml/hr. of mist until the shoots are rooted. Typically the shoots will root within about 8 weeks. It was discovered that if excised shoots received less than 1.5 ml/hr. of mist or more than 4.5 ml/hr. of mist, mortality occurred.

The present method provides a procedure according to which a large number of genetically identical trees can be produced from a single genetically superior tree. The present method of vegetative propagation by hedging is advantageous in view of other methods of vegetative propagation, in that shoots are produced rapidly, in large number, and exhibit juvenile characteristics. The present method also permits the establishment of hedge orchards in greenhouses which provide for a ready supply of genetically superior trees and which may reduce the seasonal influence on rooting.

The following examples present illustrative but non-limiting embodiments of the present invention.

EXAMPLES

Figure 2:
FIG. 2 is a photograph of a loblolly pine seedling after hedging.

Loblolly pine seedlings (FIG. 1), ranging in age from 1 to 3 years, which had been grown in 6-inch pots in a greenhouse environment, were severely hedged, leaving only 8 to 12 inches of stem and one lateral branch intact with very little green tissue (FIG. 2). Stem diameters at the cut end ranged from ¾ to 1 inch. The hedged seedlings were maintained in the greenhouse environment.

Figure 3:
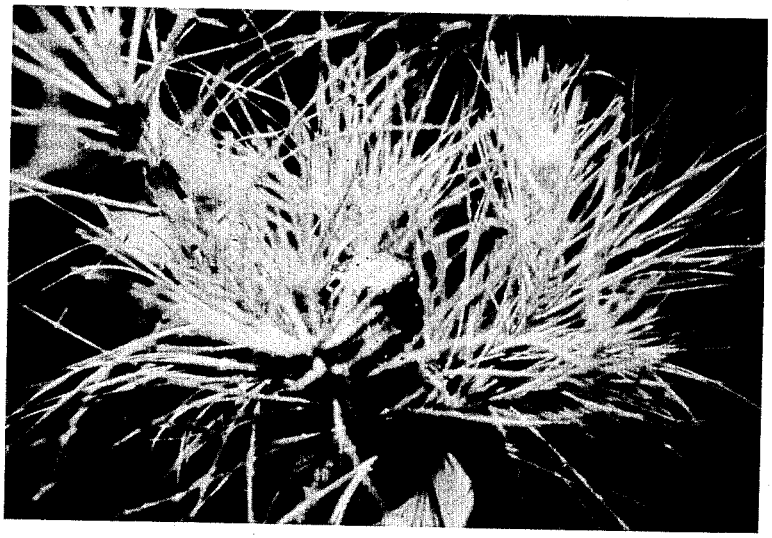
FIG. 3 is a photograph of shoots obtained near the cut end of the stem of a hedged loblolly pine seedling.
Figure 4:
FIG. 4 is a photograph of severely hedged loblolly pine seedlings with activated juvenile shoots.

After 4 to 8 weeks, numerous vigorously growing (i.e. healthy) shoots were obtained near the cut ends of the stems in close proximity to the root system (FIG. 3). The shoots were succulent and had the morphological attributes of juvenility. These shoots had primary needles similar to the needles of germinated seedlings; the secondary needles or needle fascicles had not yet formed. Hedged seedlings with activated shoots are shown in FIG. 4. The number of shoots per seedling ranged from 8 to 20. Some of the shoots were removed from the seedlings and were rooted. After the shoots were removed, more shoots were produced by the stems.

The severed shoots were rooted according to the following method. The stem ends of the shoots were dipped in water followed by a dip in a rooting powder (Hare's powder: indole-3-butyric acid (1 g), 1-phenol-3-methyl-5-pyrazolone (1 g), N-dimethylamino succinamic acid (1.2 g), talc (73.4 g), Captan 50% (40 g), powdered sugar (10 g); for a half strength powder, the talc is increased to 146.8 g). There was no apparent difference in result when half-strength powder was used instead of full-strength powder. The coated stems were then planted in a soil mix (2 peat: 2 perlite: 3 vermiculite (vol: vol: vol)) in $4\frac{1}{2} \times 6\frac{1}{2} \times 2$ & $\frac{3}{4}$ inch plastic boxes and placed on an open mist bench. Shoots rooted within 2 months.

This experiment was run 3 times; in June and November of one year, and in January of the following year. No variation in the percentage shoot activation was apparent. The method was applied to 30 seedlings and almost every seedling formed shoots. The shoots produced had juvenile characteristics.

We claim:

1. A method of asexually propagating pine trees, comprising:
   (a) severing the main stem of a pine seedling at a height above the ground of up to 12 inches and detaching the branches from the remaining main stem such that only one lateral branch remains intact and attached to the remaining main step;
   (b) growing the remaining main stem and attached lateral branch at least until the cut end of the remaining main stem produces shoots having juvenile characteristics;
   (c) severing the shoots from the remaining stem; and
   (d) rooting the shoots.

2. The method of claim 1 wherein in step (a) the pine seedling is between about 6 months and about 4 years old.

3. The method of claim 2 wherein the pine seedling is between about 1 and 3 years old.

4. The method of claim 1 wherein in step (b) the shoots are succulent, juvenile shoots having predominantly primary needles.

5. The method of claim 1 wherein in step (b) the shoots are produced in close proximity to the root system.

6. The method of claim 1 wherein in step (a) the pine seedling is loblolly pine (*Pinus taeda*).

7. The method of claim 1 wherein the main stem is severed at a height above the ground of from about 8 to about 12 inches.

8. The method of claim 1 wherein in step (c), the shoots are severed from the main stem when the shoots are about 1 inch in length.

9. The method of claim 1 wherein step (d) comprises contacting the stem ends of the shoots with a rooting medium containing indole-3-butyric acid, planting the shoots in soil, and maintaining the planted shoots in an environment such that the shoots receive from about 1.5 to 4.5 ml/hr. of mist, until the shoots are rooted.

* * * * *